US 6,705,103 B2

(12) United States Patent
Leuthner

(10) Patent No.: US 6,705,103 B2
(45) Date of Patent: Mar. 16, 2004

(54) DEVICE AND METHOD FOR COOLING

(75) Inventor: Stephan Leuthner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,914

(22) PCT Filed: Sep. 25, 2001

(86) PCT No.: PCT/DE01/03692
§ 371 (c)(1),
(2), (4) Date: Jun. 24, 2002

(87) PCT Pub. No.: WO02/052206
PCT Pub. Date: Jul. 4, 2002

(65) Prior Publication Data
US 2002/0189271 A1 Dec. 19, 2002

(30) Foreign Application Priority Data
Dec. 23, 2000 (DE) .......................... 100 65 002

(51) Int. Cl.⁷ .......................... F25B 27/00; F25B 13/00
(52) U.S. Cl. ..................... 62/238.6; 62/323.1
(58) Field of Search ............. 62/238.6, 323.1, 62/243, 114, 430, 434

(56) References Cited
U.S. PATENT DOCUMENTS 3,866,433 A * 2/1975 Krug .......................... 62/229
4,271,679 A * 6/1981 Schafer ..................... 62/238.4
5,056,330 A * 10/1991 Isobe et al. ................ 62/236
5,685,160 A * 11/1997 Abersfelder et al. ........ 62/114
6,047,770 A * 4/2000 Suzuki et al. .............. 165/202
6,059,016 A * 5/2000 Rafalovich et al. ......... 165/41
6,178,761 B1 * 1/2001 Karl .......................... 62/159
6,260,367 B1 * 7/2001 Furuya et al. .............. 62/197
6,293,123 B1 * 9/2001 Iritani et al. ................ 62/409
6,314,750 B1 * 11/2001 Ishikawa et al. ........... 62/324.1
6,343,486 B1 * 2/2002 Mizukami .................. 62/509
6,427,472 B1 * 8/2002 Nakagawa et al. .......... 62/430

FOREIGN PATENT DOCUMENTS

| DE | 195 13 710 A | * | 10/1995 |
| DE | 195 00 445 | * | 7/1996 |
| DE | 195 00 445 A | | 7/1996 |
| EP | 0 256 305 A | * | 2/1988 |
| EP | 0 960 755 A | | 12/1999 |
| EP | 1 057 669 A | | 12/2000 |
| FR | 2 772 426 A | * | 6/1999 |

* cited by examiner

Primary Examiner—William C. Doerrler
(74) Attorney, Agent, or Firm—Michael J. Striker

(57) ABSTRACT

The invention relates to an apparatus for cooling, having a loop (60) carrying a refrigerant, a first heat exchanger (10) for outputting heat to a heat reservoir (12), a second heat exchanger (114) for extracting heat from a chamber (116) to be cooled, a compressor (18) and an expansion device (120), wherein in that a first further heat exchanger (70) is provided, which enables a heat transfer between the loop (60) carrying the refrigerant and a coolant loop (80). The invention also relates to a method for cooling.

12 Claims, 3 Drawing Sheets

DEVICE AND METHOD FOR COOLING

The invention relates to an apparatus for cooling, having a loop carrying a refrigerant, a first heat exchanger for outputting heat to a heat reservoir, a second heat exchanger for extracting heat from a chamber to be cooled, a compressor and an expansion device. The invention also relates to a method for cooling, by means of an apparatus for cooling, having a loop carrying a refrigerant, a first heat exchanger for outputting heat to a heat reservoir, a second heat exchanger for extracting heat from a chamber to be cooled, a compressor and an expansion device, having the steps of operating the compressor and conducting the refrigerant through the loop carrying the refrigerant.

PRIOR ART

Apparatuses and methods of the above generic type are used particularly for climate control in vehicle passenger compartments.

Figure 3:
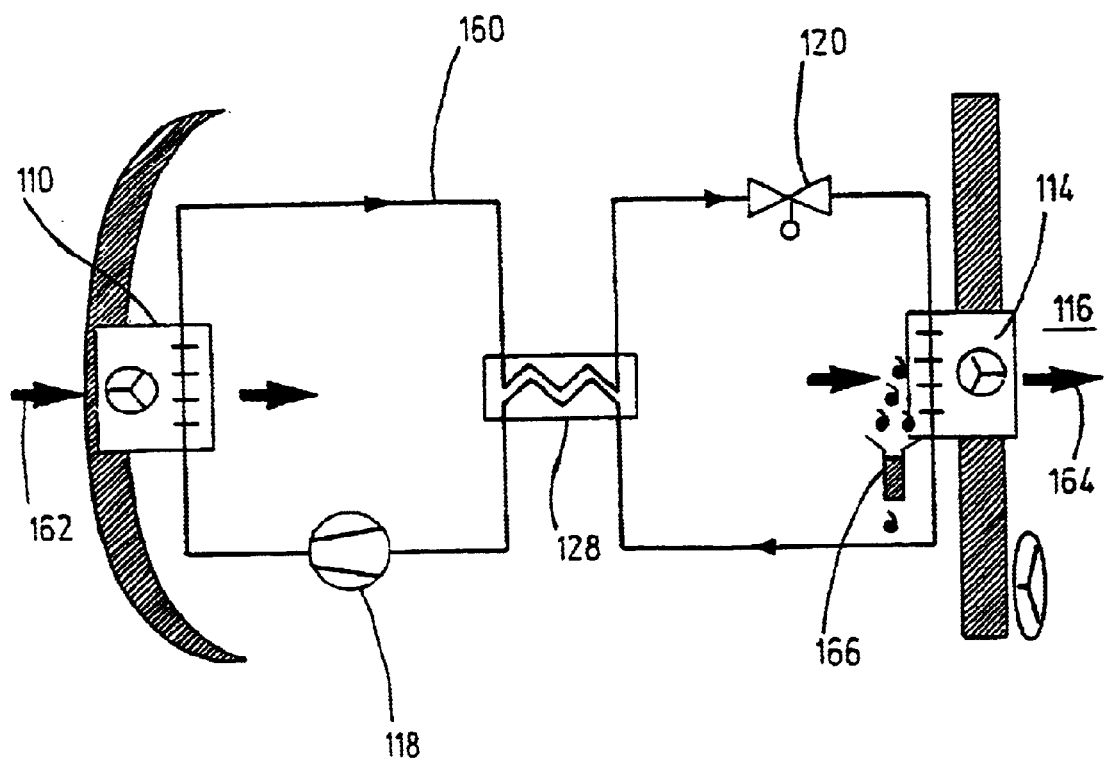

FIG. 3 schematically shows an air conditioner circuit. A first medium enters a first heat exchanger 110 and flows through a loop 160. The medium gives up heat to the ambient air 162 and thus cools itself down. A cooled medium emerges from the heat exchanger 110. This cooled medium is now conducted through an inner heat exchanger 128, whose function will be explained hereinafter. After the medium has emerged from the inner heat exchanger 128, it enters an expansion device 120. The medium cools down sharply from expansion and is then delivered to a second heat exchanger 114. In this heat exchanger 114, the cold medium can cool down warm ambient air or circulating air and made available, in the form of cold air 164, to a chamber to be cooled, such as the motor vehicle interior. In this process, the development of condensate 166 occurs. The medium, now evaporated and possibly heated by the heat exchange in the heat exchanger 114, emerges from the heat exchanger 114 and then flows again through the inner heat exchanger 128. After emerging from the inner heat exchanger 128, the medium enters a compressor 118, where it is heated by compression. Thus a heated medium is again available, which can enter a first heat exchanger 110 for heat exchange. The loop is closed.

The inner heat exchanger 128 serves to increase the power in the loop. Before entering the expansion device 120, the medium is cooled by the returning medium, which has emerged from the second heat exchanger 114 and is heated in reflux. Higher temperature differences and hence an increase in the efficiency in the loop can thus be achieved.

As the medium in the coolant loop, $CO_2$ is gaining in significance. The interest in this natural refrigerant is increasing, given the rules and regulations requiring that the use of CFCs be stopped.

Compared to conventional refrigerants, $CO_2$ has a lower critical temperature of 31.1° C. Above this temperature, liquefaction from a pressure increase is no longer possible. At medium and high ambient temperatures, the heat output therefore occurs at a so-called supercritical pressure, that is, a pressure that for $CO_2$ is above 73.8 bar. At supercritical pressure, the heat output does not occur by condensation, as in the conventional refrigerants, which occurs at a virtually constant temperature; instead, the pressure and temperature are independent of one another. Gas cooling takes place. However, the states in the evaporator continue to be subcritical. Another notable feature of the behavior of $CO_2$ is that temperatures of about 140 to 150° C. are already attained in idling.

ADVANTAGES OF THE INVENTION

The invention improves upon the generic apparatus in that a first further heat exchanger is provided, which enables a heat transfer between the loop carrying the refrigerant and a coolant loop. The refrigerant, which can quickly be imparted a high temperature, is thus capable of heating the vehicle coolant. This has numerous advantages. It is already known, to enhance comfort, for the vehicle to be air-conditioned several minutes before a trip begins. For a heated passenger compartment, the air conditioner compressor is operated, so that the refrigerant is compressed. Because once the refrigerant has been compressed before being introduced into the first heat exchanger it is carried into the first further heat exchanger, the coolant can be preheated. In this way, the temperature of the coolant is already at operating temperature even before the internal combustion engine is started. By means of the first further heat exchanger, it is likewise possible for the water located in the radiator to be used at high pressure to cool the refrigerant as needed.

Preferably, the first further heat exchanger is disposed downstream of the compressor in the loop carrying the refrigerant. In this way, the refrigerant is introduced at high temperature into the heat exchanger, so that rapid heating of the coolant in the coolant loop can occur.

It is preferred that the compressor can be operated by a starter/generator or a battery. This starter/generator, which is disconnected from the drive shaft of the engine via a clutch, can thus furnish both the energy for pre-air-conditioning and the energy for heating the coolant before the engine is started.

It is also advantageous that a water pump of the coolant loop can be operated by a starter/generator or a battery. The coolant is thus pumped through the heat exchanger because of the work of the starter/generator.

It is especially advantageous if the first heat exchanger includes a gas cooler. In this way, a heat exchange in the first heat exchanger is not brought about by condensation, as in the conventional refrigerants. Instead, a heat exchange in the gas takes place.

It is especially advantageous if $CO_2$ is provided as the refrigerant. With $CO_2$, the advantages of the invention can be employed especially well, since the $CO_2$ can be compressed by the compressor to pressures of 100 to 150 bar, using the starter/generator, making it possible to attain temperatures between 140 and 180° C. Rapid heating of the coolant in the coolant loop thus occurs.

It is equally advantageous if a second further heat exchanger is provided between the coolant loop and the motor oil. In this way, the motor oil can be brought to an elevated temperature as well before the engine is started.

In this connection, it can be especially advantageous that a motor oil pump, which can be operated by a starter/generator or a battery, is provided in the motor oil loop. Because of this circumstance, not only the compressor and the water pump but the motor oil pump can also be operated by the starter/generator. It is equally conceivable for a heat exchanger to be placed in the oil sump, that is, in the region of the oil pan, which heat exchanger has coolant flowing through it, so that the heat from the refrigerant is output to the motor oil via the engine coolant. As a heat exchanger, the heat exchanger present in Diesel vehicles between the coolant and the oil can also be used.

There are particular advantages if a third further heat exchanger is provided between the coolant loop and the gear lubricant oil. Thus the gear lubricant oil as well can be brought to temperatures near operating temperatures before the vehicle is put into operation.

It is especially useful if a reversible valve is provided, which can reroute the coolant loop to avoid additional heat flows. This function is useful if no additional heat flows in the coolant during engine operation are wanted. In principle, however, the heat exchanger can also be operated without valves, since the coolant temperatures are below 120° C. The additional heat quantity that is output to the engine coolant by the loop carrying the refrigerant can be output to the ambient air via the coolant heat exchanger. The surface area of the coolant heat exchanger need not be increased for this purpose, since the heat is produced at a higher temperature level. The surface area of the gas cooler for cooling the refrigerant, however, can be reduced, since some of the heat is already output to the coolant before entering the gas cooler.

It is especially advantageous that an inner heat exchanger is provided between the first heat exchanger and the second heat exchanger. An inner heat exchanger of this kind serves to increase the power of the air conditioner. The refrigerant is precooled by returning refrigerant before the expansion in the expansion device. The returning refrigerant is likewise precooled, prior to compression in the compressor, by the arriving refrigerant.

The invention improves on the generic method in that the refrigerant is conducted through a first further heat exchanger, in which heat is transferred between the loop carrying the refrigerant and a coolant loop. In this way, the advantages of the apparatus of the invention are applied to the method as well.

It is especially advantageous if the compressor is operated by a starter/generator or a battery. This starter/generator, which is disconnected from the drive shaft of the engine via a clutch, can thus furnish both the energy for pre-air-conditioning and the energy for heating the coolant before the engine is started.

Preferably, it is also advantageous that a water pump of the coolant loop can be operated by a starter/generator or a battery. The coolant is thus pumped through the heat exchanger because of the work of the starter/generator.

It is useful if $CO_2$ is used as the refrigerant. With $CO_2$, the advantages of the invention can be employed especially well, since the $CO_2$ can be compressed by the compressor to pressures of 100 to 150 bar, using the starter/generator, making it possible to attain temperatures between 140 and 180° C. Rapid heating of the coolant in the coolant loop thus occurs.

Especially advantageously, the coolant in the coolant loop is conducted through a second further heat exchanger, in which a heat exchange with the motor oil takes place. In this way, the motor oil can also be brought to an elevated temperature before the engine is started.

It is also useful that motor oil is pumped through the second further heat exchanger by a motor oil pump, and that the motor oil pump is operated by a starter/generator or a battery. Because of this circumstance, not only the compressor and the water pump but the motor oil pump can also be operated by the starter/generator. It is equally conceivable for a heat exchanger to be placed in the oil sump, that is, in the region of the oil pan, which heat exchanger has coolant flowing through it, so that the heat from the refrigerant is output to the motor oil via the engine coolant. As a heat exchanger, the heat exchanger present in Diesel vehicles between the coolant and the oil can also be used.

It is preferred if the coolant in the coolant loop is conducted through a third further heat exchanger, in which a heat exchange with the gear lubricant oil takes place. Thus the gear lubricant oil as well can be brought to temperatures near operating temperatures before the vehicle is put into operation.

It is especially advantageous if a reversible valve is used, which reroutes the coolant loop to avoid additional heat flows. This function is useful if no additional heat flows in the coolant during engine operation are wanted. In principle, however, the heat exchanger can also be operated without valves, since the coolant temperatures are below 120° C. The additional heat quantity that is output to the engine coolant by the loop carrying the refrigerant can be output to the ambient air via the coolant heat exchanger. The surface area of the coolant heat exchanger need not be increased for this purpose, since the heat is produced at a higher temperature level. The surface area of the gas cooler for cooling the refrigerant, however, can be reduced, since some of the heat is already output to the coolant before entering the gas cooler.

The method is furthermore advantageously refined in that an inner heat exchanger is used between the first heat exchanger and the second heat exchanger. An inner heat exchanger of this kind serves to increase the power of the air conditioner. The refrigerant is precooled by returning refrigerant before the expansion in the expansion device. The returning refrigerant is likewise precooled, prior to the compression in the compressor, by the arriving refrigerant.

The invention is based on the recognition that especially in air conditioners that use $CO_2$ as the refrigerant, an advantageous preheating of the coolant can be done. To that end, an additional heat exchanger is provided, and the preheating of the coolant can in particular be done along with the pre-air-conditioning of the passenger compartment of the vehicle.

DRAWINGS

The invention will now be described in examples in terms of preferred embodiments in conjunction with the accompanying drawings.

Figure 1:
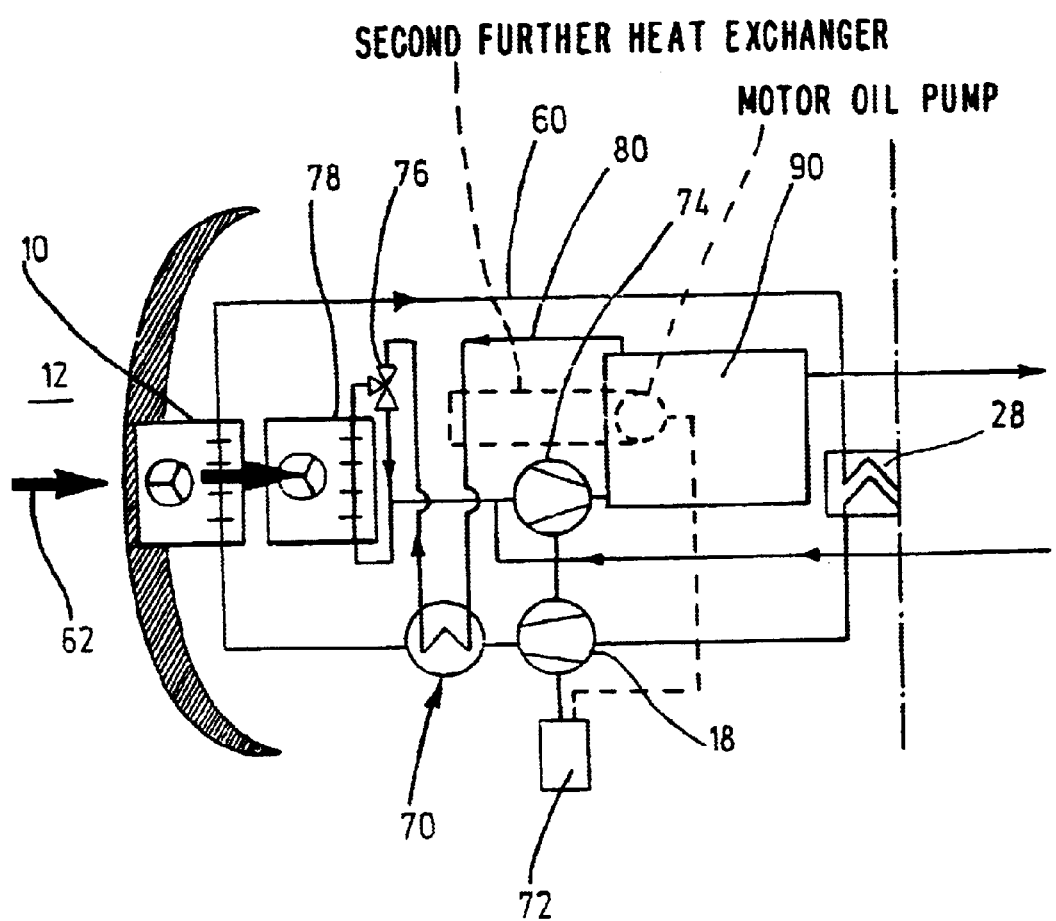
Figure 2:
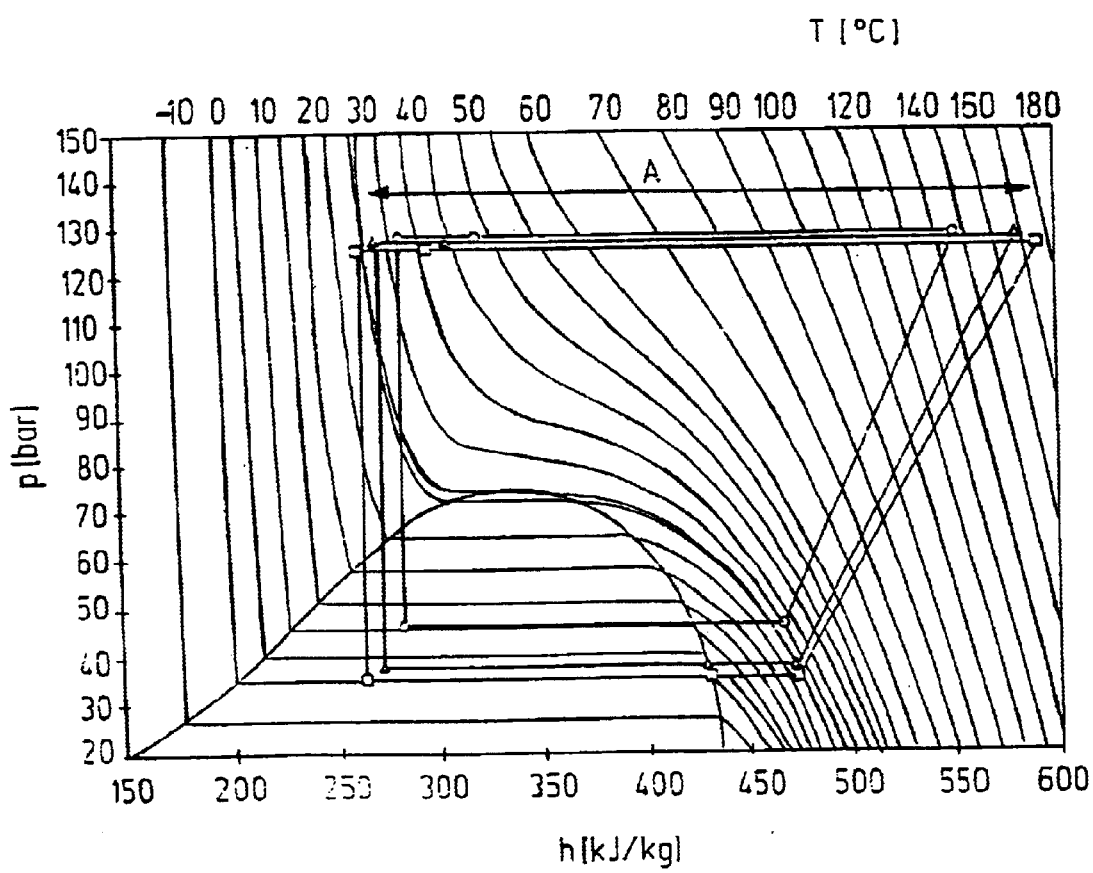

Shown are:

FIG. 1, a schematic fragmentary view of an apparatus of the invention;

FIG. 2, a state diagram, for explaining courses of events in an apparatus of the invention; and FIG. 3, a schematic illustration of an apparatus in the prior art.

DESCRIPTION OF THE EXEMPLARY EMBODIMENTS

FIG. 1 shows part of an apparatus according to the invention. The part not shown to the right of the dot-dashed line, that is, to the right of the inner heat exchanger 28, corresponds to the apparatus that is shown in FIG. 3 to the right of the inner heat exchanger 128 and has already been described in conjunction with the prior art.

In FIG. 1, two loops are shown. First, the loop 60 of a refrigerant for operating the air conditioner is shown. Second, a coolant loop 80 for cooling an internal combustion engine 90 is shown. The refrigerant is compressed by a compressor 18. This compressor 18 is operated by a starter/generator 72 before the engine 90 is started. Before the compressed refrigerant enters the first heat exchanger 10 in order to output heat, the refrigerant enters the first further heat exchanger 70. Coolant that is transported by the coolant loop 80 enters this heat exchanger 70 as well. The water pump 74 can also be operated by the starter/generator 72 or electrically in some other way for the sake of transporting the coolant. In this way, heat is output to the coolant, so that its temperature can reach ranges near those of operation. With the valve 76, during normal operation of the engine 90, the production of additional heat flows in the coolant can be prevented. However, it is also possible to operate the system without the valve 76, since the coolant remains below temperatures in the range of 120° C. The additional heat quantity that through the loop 60 and the first further heat exchanger 70 enters the coolant loop can be output to the ambient air via the coolant heat exchanger 78. The area of the coolant heat exchanger 78 need not be increased for that purpose, since the heat occurs at a higher temperature level. The area of the first heat exchanger 10, designed as a gas cooler, can be reduced, however, since some of the heat has already been output to the coolant before entry into the gas cooler.

FIG. 2 is a thermodynamic state diagram for $CO_2$ in which the pressure p is plotted over the specific enthalpy h. Isotherms are also shown in the graph, with the associated temperatures indicated at the upper edge of the graph. The isotherms are shown at intervals of 10° C. The isotherm is also shown at 31.1° C., which is the critical temperature of $CO_2$.

Three different cycles are plotted in the state diagram of FIG. 2. The cycle marked by blank circles is equivalent to an idling mode. The cycle represented by blank triangles is equivalent to driving at 22 km/h. The cycle marked by blank squares corresponds to driving at 64 km/h.

The diagram will now be explained, beginning at a bottom right-hand corner of an arbitrary one of the cycles. First, compression takes place, which raises the temperature of the medium. Such a compression can be caused for instance by the compressor 18 of FIG. 1. The medium thus enters a state of high temperature at high pressure, and once again the enthalpy is increased. Beginning at the upper right-hand corner of the cycles, the thermal energy is now output essentially isobarically. This output of thermal energy takes place in all cycles essentially above the critical temperature of $CO_2$; that is, gas cooling takes place. The range of gas cooling is marked by the double arrow A. The system reaches states corresponding to the upper left-hand corner of the cycles, that is, states of reduced enthalpy and reduced temperature. An expansion thereupon occurs, so that both the temperature and the pressure vary, with essentially unchanged enthalpy. The lower left-hand point of the cycles is now reached. In these states, the $CO_2$ is partially liquefied. This is possible since the temperature is subcritical. The events caused by the exceeding of the critical temperature limit are called "transcritical". Next, the refrigerant absorbs heat, so that without a pressure change, the lower right-hand point of the various cycles is reached. The cycles are thus completed.

The above description of the exemplary embodiments of the present invention is meant solely for illustrative purposes and not for the sake of limiting the invention. Various changes and modifications can also be made within the scope of the invention without departing from the scope of the invention or its equivalents.

What is claimed is:

1. An apparatus for cooling, having
   a loop (60) for carrying a refrigerant,
   a first heat exchanger (10) for outputting heat to a heat reservoir (12),
   a second heat exchanger (114) for extracting heat from a chamber (116) to be cooled,
   a compressor (18) and an expansion device (120), characterized in that a first further heat exchanger (70) is provided, which enables a heat transfer between the loop (60) carrying the refrigerant and a coolant loop (80), wherein the compressor (18) is operated directly electrically by a starter/generator (72),
   a second further heat exchanger is provided between the coolant loop and a motor oil, and a motor oil pump is provided in a motor oil loop.

2. The apparatus of claim 1, wherein the first further heat exchanger (70) is disposed downstream of the compressor (18) in the loop (60) carrying the refrigerant.

3. The apparatus of claim 1, wherein a water pump (74) of the coolant loop (80) can be operated directly electrically by a starter/generator (72) or a battery.

4. The apparatus of claim 1, wherein the first heat exchanger (10) includes a gas cooler.

5. The apparatus of claim 1, wherein $CO_2$ is provided as the refrigerant.

6. The apparatus of claim 1, wherein a reversible valve (76) is provided, which can reroute the coolant loop to avoid additional heat flows.

7. The apparatus of claim 1, wherein an inner heat exchanger (28) is provided between the first heat exchanger (10) and the second heat exchanger (114).

8. A method for cooling by means of an apparatus having a loop (60) carrying a refrigerant, a first heat exchanger (10) for outputting heat to a heat reservoir (12), a second heat exchanger (114) for extracting heat from a chamber (116) to be cooled, a compressor (18) and an expansion device (12), having the following steps:
   driving the compressor (18), and
   conducting the refrigerant through the loop (60) carrying the refrigerant, characterized in that the refrigerant is conducted through a first further heat exchanger (70), in which heat is transferred between the loop (60) carrying the refrigerant and a coolant loop (80), wherein the compressor (18) is operated directly electrically by a starter/generator (72),
   a coolant loop in the coolant loop is conducted through a second further heat exchanger, in which a heat exchange with a motor oil takes place, and
   the motor oil is pumped through the second further heat exchanger by a motor oil pump.

9. The method of claim 8, wherein a water pump (74) of the coolant loop (80) is operated directly electrically by a starter/generator (72) or a battery.

10. The method of claim 8, wherein $CO_2$ is used as the refrigerant.

11. The method of claim 8, wherein a reversible valve is used, which reroutes the coolant loop to avoid additional heat flows.

12. The method of claim 8, wherein an inner heat exchanger (28) is used between the first heat exchanger (10) and the second heat exchanger (114).

* * * * *